No. 859,122.  
PATENTED JULY 2, 1907.
M. F. SCHOLL & M. F. BURKHART.
TRUCK.
APPLICATION FILED FEB. 26, 1906.
2 SHEETS—SHEET 1.
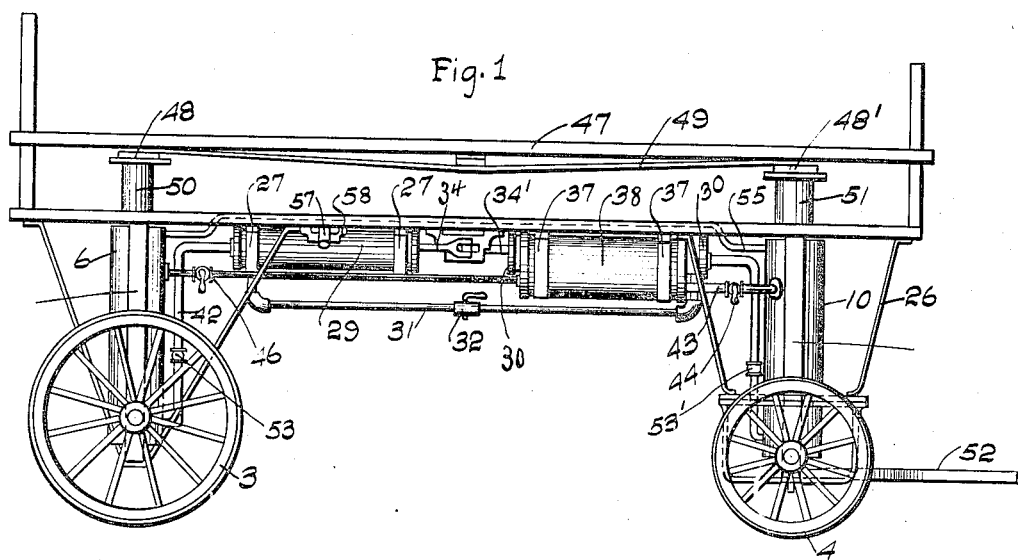
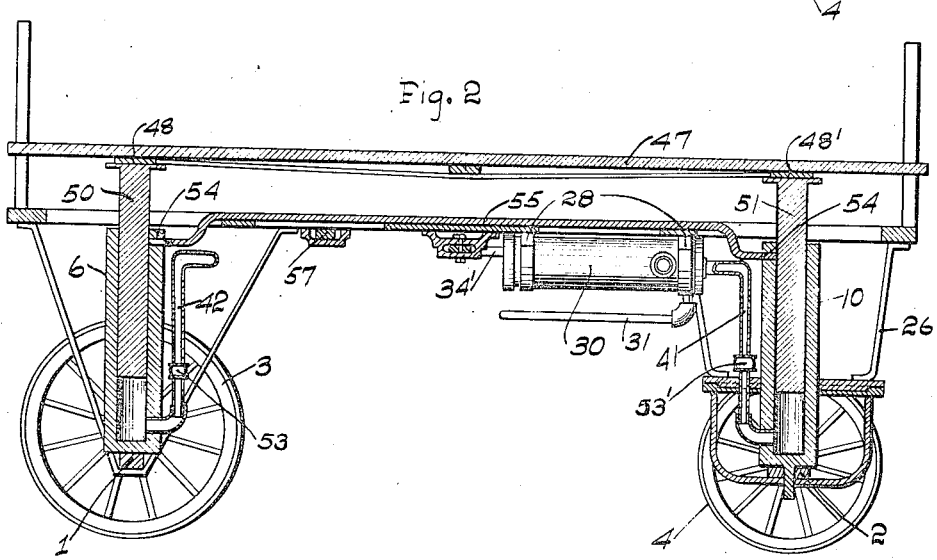
WITNESSES  
E. A. Prokop.  
Inventors  
Milland F. Scholl  
Michael F. Burkhart  
By H. C. Everttle  
ATTORNEYS No. 859,122. PATENTED JULY 2, 1907.
M. F. SCHOLL & M. F. BURKHART.
TRUCK.
APPLICATION FILED FEB. 26, 1906.
2 SHEETS—SHEET 2.
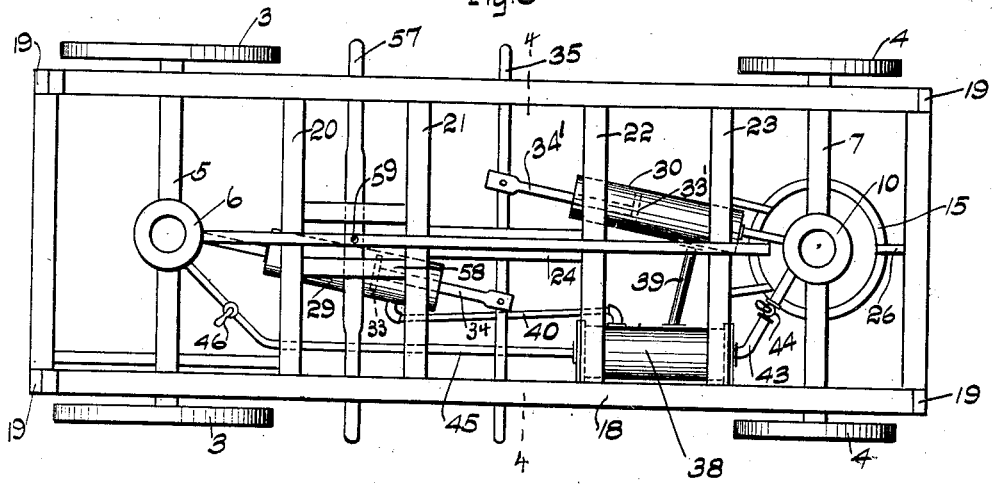
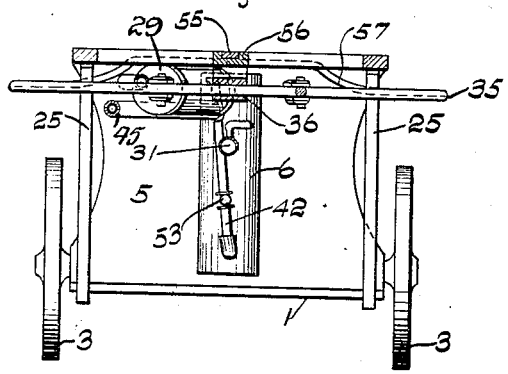
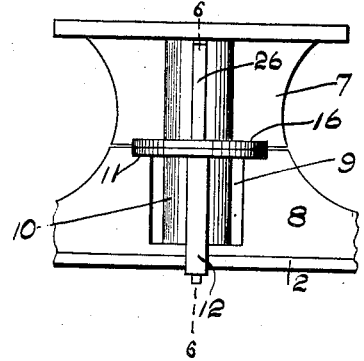
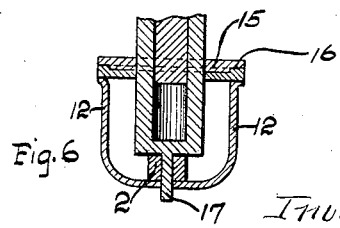
WITNESSES
E. A. Prokop.
R. H. Butler.
Inventors
Millard F. Scholl
Michael F. Burkhart.
By H. C. Everett Co.
Attorneys

UNITED STATES PATENT OFFICE.

MILLARD F. SCHOLL AND MICHAEL F. BURKHART, OF WEST NEWTON, PENNSYLVANIA.

TRUCK.

No. 859,122.   Specification of Letters Patent.   Patented July 2, 1907.

Application filed February 26, 1906. Serial No. 302,975.

*To all whom it may concern:*

Be it known that we, MILLARD F. SCHOLL and MICHAEL F. BURKHART, citizens of the United States of America, residing at West Newton, in the county of Westmoreland and State of Pennsylvania, have invented certain new and useful Improvements in Trucks, of which the following is a specification, reference being had therein to the accompanying drawing.

This invention relates to certain new and useful improvements in vehicles, and the invention relates more particularly to trucks, as expressmen's trucks.

The primary object of this invention is the provision of novel means in connection with a truck, whereby the bed or platform of a truck, can be elevated to any desired position.

My invention aims to provide a truck particularly adapted for express companies where the trucks are employed for transferring packages or articles from a station or freight office to trains.
It is a well known fact that the floor line of a railroad car is of a greater height than the bed or platform of a truck, consequently necessitating the lifting of articles from a truck to a car. In some instances, where the packages or articles are large and heavy, considerable labor and time is necessary to transfer the packages or articles from a truck to a car, and where a great many packages or articles are to be transferred to a train in a short period of time, a train is often delayed by the slow progress made in transferring the packages.
My invention aims to obviate the above defect by providing a truck, the bed or platform of which may be elevated to a plane horizontal with the floor of a car, or slightly above the floor, whereby large and heavy articles being transferred to a car can be dragged from the truck to the interior of the car in a comparatively short time and with less labor than if it were necessary to lift the articles from a truck of the ordinary construction.

The numerous advantages of my improved truck will be apparent to those familiar with the handling of trucks, and with the above and other objects in view, the invention consists in the novel construction, combination and arrangement of parts to be hereinafter more fully described and claimed, and referring to the drawing accompanying this application, like numerals of reference designate corresponding parts throughout the several views, in which:—

Figure 1 is a side elevation of my improved truck, Fig. 2 is a longitudinal sectional view of the same, Fig. 3 is a plan of the truck, the bed or platform thereof being removed, Fig. 4 is a cross sectional view of the truck on the line 4—4 of Fig. 3, Fig. 5 is a front elevation of a portion of the front bolster or running gear. Fig. 6 is a detail sectional view of a portion of the forward running gear on the line 6—6 of Fig. 5. Fig. 7 is a detail sectional view enlarged of the vertical cylinder of the forward truck, Fig. 8 is an enlarged sectional detail of the "fifth-wheel" structure.

To put my invention into practice, I construct my improved truck of a running gear consisting of a rear axle 1 and a front axle 2, the ends of said axles being provided with ground wheels 3, 3 and 4, 4 respectively. The rear axle supports a bolster 5 having a vertically disposed cylinder 6 centrally thereof. The front axle 2 is provided with a two-part bolster 7 and 8, supported within the upper bolster portion 7 is a cylinder 10, and extending downwardly into a cut-away portion 9 in the lower bolster member 8 and bearing upon the axle 2 and provided with a stud 17 extending downwardly through the axle 2, and thus performing the function of a king bolt or linch pin on which the forward axle rotates. Supported by the lower part 8 of the bolster and surrounding the cylinder 10 is the lower half 11 of a fifth-wheel which is further supported by straps 12, 12 that extend under the axle 2 and around the pin 17 and are arranged at right angles to the lower part 8 of the bolster. The lower half 11 of the fifth wheel is recessed, as at 14, and revolubly mounted in said recess is a depending portion 16 of the upper half 15 of the fifth wheel, the upper half 15 of the fifth wheel being supported by the upper part 7 of the bolster.

Supported by the rear and front bolsters is a rectangular frame 18 having upright corner posts 19. The rectangular frame is braced by a plurality of transverse bars 20, 21, 22, and 23, the bars 21 and 22 being connected together by a longitudinally disposed bar 24. The rear bolster 5 is braced by straps 25, 25 secured to the rear end of the frame 18 and to the bar 20, said straps passing beneath the rear axle 1 of the truck. The upper half 15 of the fifth wheel is also braced by straps 26 which are connected to the forward end of the frame 18 and to the transverse bar 23.

The transverse bars 20 to 23 inclusive, are provided with depending straps 27, 27 and 28, 28, the straps 27 supporting an angularly disposed horizontally arranged cylinder 29, while the straps 28, 28 support a similar cylinder 30. The outer ends of the cylinders 29 and 30 are connected together by a pipe 31 carrying a conventional form of valve or cock 32. In the cylinders are mounted piston heads 33, 33' having piston rods 34 34' which extend through the inner ends of the cylinders and are pivotally connected at their inner ends to a transverse operating lever 35, which is pivoted in a bracket 36 carried by the longitudinally disposed bar 24 of the frame 18.

The transverse bars 22 and 23 are provided with depending straps 37, 37 supporting a reservoir cylinder 38, which is connected to the cylinder 30 by a pipe 39 and to the cylinder 29 by a pipe 40.

The cylinder 30 is connected to the lower end of the cylinder 10 by a pipe 41, while the cylinder 29 is connected to the cylinder 6 by a pipe 42. The upper end of the cylinder 10 is connected to the reservoir cylinder 38 by a pipe 43 having a cock 44. The pipe 43 communicates with the lower end of the cylinder 10 by a by-path 44′ formed within one of the walls of the cylinder, as shown in Fig. 7, so that the supply of oil under pressure is fed to the cylinder beneath the plunger therein, as hereafter explained. The cylinder 6 connects with the reservoir cylinder 38 by a pipe 45 having a cock 46. The various connecting pipes are suitably arranged beneath the frame 18, and will be suitably supported from the transverse bars 20 to 23 inclusive.

Slidably mounted upon the corner posts 19 is a bed or platform 47, which has its bottom side provided with transverse beams 48, 48, said beams being connected together by truss rods 49 to support the central portion of the bed or platform 47 when the same is in an elevated position. The platform 47 is provided with beams 48, 48′, and the beams are provided with depending pistons 50 and 51, said pistons fitting in the cylinders 6 and 10 respectively. The forward axle 2 of the truck carries a conventional form of handle 52 by which the truck may be pulled or steered when being moved.

In practice, I use a liquid or fluid such as a heavy lubricating oil within the cylinders 29, 30, 6, 10 and in the reservoir cylinder 38, the oil being stored within the cylinders 29, and 30 and the reservoir 38, said reservoir 38 being of sufficient size to contain enough of the fluid to fill the cylinders 6 and 10. The normal position of the bed or platform 47 is resting upon the frame 18, and when it is desired to elevate the bed or platform 47, the operating rod or lever 35 is manipulated by the attendants of the truck, upon each side thereof. By reciprocating the pistons 33—33′ of the cylinders 29 and 30, the oil or fluid contained within the reservoir cylinder 38 and the cylinders 29 and 30 will be forced into the cylinders 6 and 10, and will elevate the pistons 50 and 51, together with the bed or platform 47, said bed or platform being guided in its upward movement by the corner posts 19, 19 of the frame 18. After the bed or platform 47 has been elevated to the desired height, the fluid is retained within the cylinders 6 and 10 by check valves 53, 53′ carried by the pipes 41 and 42 respectively. The fluid is prevented from escaping to the reservoir cylinder 38 by the cocks 44 and 46 carried by the pipes 43 and 45 respectively, these cocks being closed while the pistons 50 and 51 are being elevated. When it is desired to lower the bed or platform 47, the cocks 44 and 46 are opened which permits of the fluid passing from the cylinders 6 and 10 into the reservoir cylinder 38, it of course being understood that the cylinder 6 is provided with a by-path similar to the cylinder 10. After the bed or platform has descended by gravity on account of its own weight, the cocks 44 and 46 are closed.

In case it is desired to operate the bed or platform 47 of my improved truck by air, I have provided the upper ends of the cylinders 6 and 10 with confronting openings 54, 54 which are in the upper ends of the cylinders 6 and 10 above the pipes 43 and 45. One of these openings is normally open and both of said openings are controlled by a reciprocating rod 55 slidably mounted in grooves 56 formed in the top surface of the transverse bars 20 to 23 inclusive. The rod 55 is reciprocated by a lever 57 pivoted in a depending bracket 58 carried by the bars 20 and 21, said lever being pivotally connected to the rod 55 as at 59.

When air is used for elevating the pistons 50 and 51 the cocks 44 and 46 are closed and air is pumped from the reservoir cylinder 38, through the cylinders 29 and 30 into the cylinders 6 and 10. To permit of the bed or platform 47 descending by gravity the air is permitted to escape from the cylinders 6 and 10 around the pistons 50 and 51, passing through the openings 54, 54 and as the air in the cylinders acts as a cushion for the pistons 50 and 51, and the lever 57 which operates the rod 55, is reciprocated to close the opening in one of the cylinders before the piston carried by the other end of the platform and operating in the other cylinder has descended far enough to bind, a steady descent of the platform is assured.

In practice, I preferably operate my improved trucks by the use of fluid which is admitted into the cylinders 6 and 10. By the arrangement of the valves and check valves, it will be observed that the fluid is used continuously and insures a perfect and easy co-operation of the various pistons of my improved truck.

While I have herein described the truck as being particularly adapted for express companies, it is obvious that the same principle embodied in the truck may be readily used in connection with a vehicle, such as transfer wagons and drays.

I do not care to confine myself to the detail arrangement of the cylinders, and their appurtenant parts and it is obvious that such changes, as are permissible by the appended claims, may be resorted to without departing from the spirit and scope of the invention.

What we claim and desire to secure by Letters Patent, is:—

1. In a device of the class described, a truck device including a supporting frame, bolsters, axles and ground wheels, and with vertical guide members at the corners of the frame, cylinders spaced apart beneath said frame, and supported upon said axles, a platform movably disposed above said frame and arranged to be guided by said guide members, plungers operating in said cylinders and carrying said platform, a reservoir, two pump devices, conductor pipes respectively between said pump devices and cylinders, exhaust conductor pipes respectively between said cylinders and reservoir, controlling valves in said exhaust conductor pipes, and means for simultaneously actuating said pump devices.

2. In a device of the class described, a truck including a supporting frame, axles, and ground wheels, said frame having vertical guide members at the corners cylinders supported respectively upon said axles, means for maintaining said cylinders in position relative to said axles and frame, a paltform movably disposed above said frame and arranged to be guided by said members, plungers operating in said cylinders and carrying said platform, a reservoir, pump devices connected to said cylinders and to said reservoir, exhaust pipes between said reservoir and cylinders and having controlling valves therein.

3. In a device of the class described, a truck including a supporting frame, axles and ground wheels, cylinders bearing respectively upon said axles, one of said cylinders having a stud extending through one of said axles, a lower fifth-wheel member surrounding the cylinder having the stud, a brace strap connected to said lower fifth-wheel member and extending beneath the adjacent axle and having an aperture through which said stud extends, an upper fifth-wheel member bearing upon the lower fifth-wheel member and connected to said frame, a platform plungers operating in said cylinders and supporting said platform, a reservoir, pump devices connected to said cylinders and reservoir, exhaust pipes respectively between said cylinders and reservoir, and controlling valves in said exhaust pipes, and means for simultaneously actuating said pump devices.

4. In a truck, the combination with bolsters mounted upon wheels, a fifth wheel carried by one of said bolsters, vertically disposed cylinders carried by said bolsters, a frame mounted upon said bolsters, corner posts carried by said frame, a platform slidably mounted upon said corner posts, depending pistons carried by said platform and extending into said cylinders, a reservoir carried by said frame and in communication with said bolster cylinders, pump cylinders carried by said frame and in communication with said reservoir and with said bolster cylinders, and means for simultaneously operating said pump cylinders to elevate the pistons of said bolster cylinders.

In testimony whereof we affix our signatures in the presence of two witnesses.

MILLARD F. SCHOLL.
MICHAEL F. BURKHART.

Witnesses:
C. J. HURST,
J. R. SCHOLL.